UNITED STATES PATENT OFFICE.

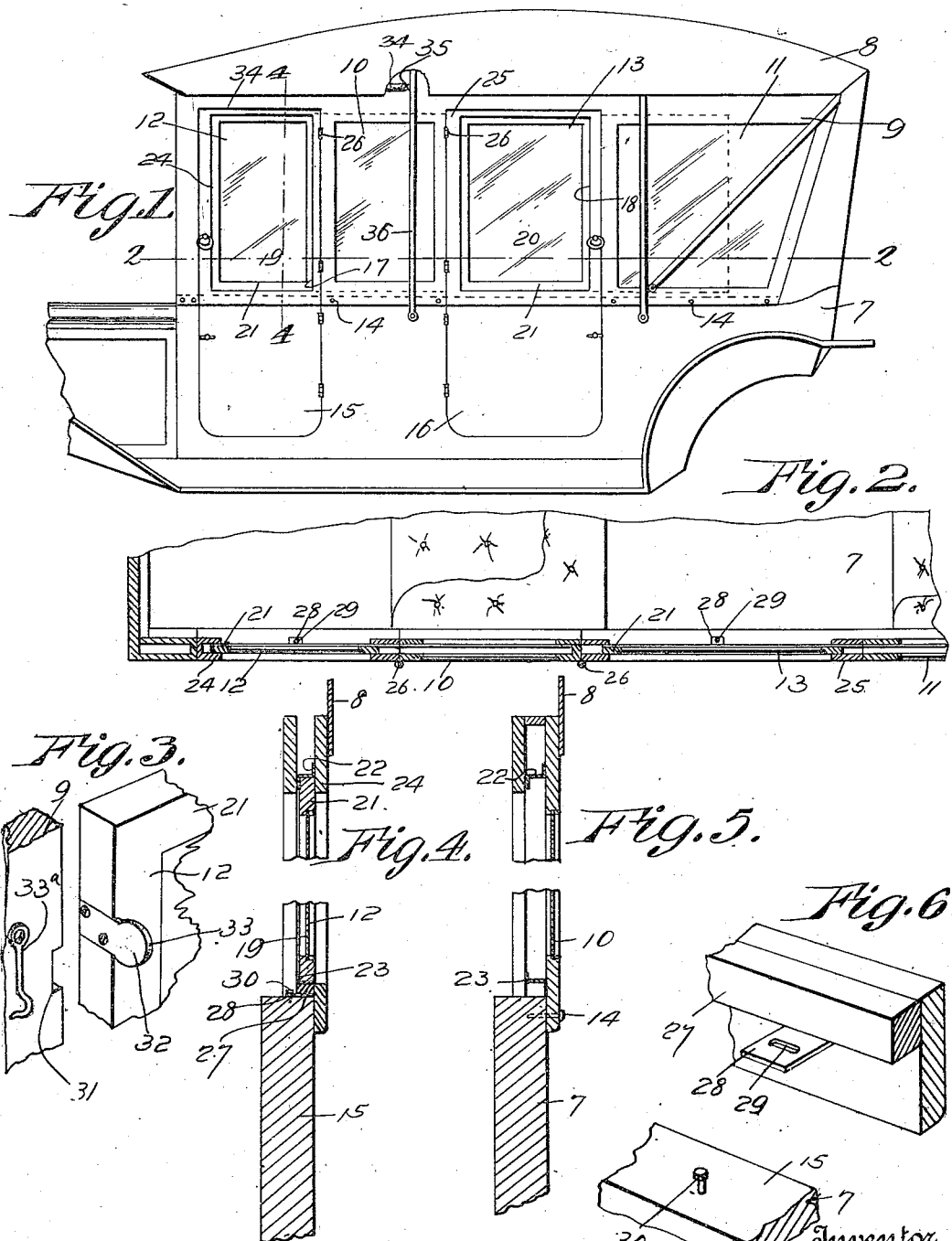

WEBB C. SWEET, OF PHILADELPHIA, PENNSYLVANIA.

VEHICLE-TOP.

1,185,553.  Specification of Letters Patent.  Patented May 30, 1916.

Application filed November 11, 1914. Serial No. 871,509.

*To all whom it may concern:*

Be it known that I, WEBB C. SWEET, a citizen of the United States of America, and resident of Philadelphia, in the county of Philadelphia and State of Pennsylvania, have invented certain new and useful Improvements in Vehicle-Tops, of which the following is a specification.

This invention relates to vehicle tops and particularly to convertible tops for automobiles in which provision is made for attaching or supplying an inclosure which will convert the automobile from an ordinary open vehicle to a closed vehicle with glass or other transparent panels so that the said automobile will resemble a limousine.

An object of this invention is to provide novel means whereby the transparent inclosing members may be moved from their normal positions to open the inclosure and permit ventilation thereof, the said means being also carried by the door operated parts of the inclosure.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a fragment of an automobile body with the invention applied thereto; Fig. 2 illustrates a sectional view of a fragment of the body on a line 2—2 of Fig. 1; Fig. 3 illustrates a perspective view of a fragment of the frame and sash, showing the means for operating the sliding sash; Fig. 4 illustrates a sectional view on the line 4—4 of Fig. 1; Fig. 5 illustrates a sectional view with the parts in different positions of adjustment: Fig. 6 illustrates a detail sectional view of the swinging frame and the means of attachment of the same to a door.

In these drawings 7 denotes an automobile body and 8 an ordinary automobile top of the folding type.

It is the purpose of the inventor to supply the ordinary folding or foldable top with a glazed inclosure and the said inclosure comprises side frames, such as the side frame 9 with a plurality of openings therein corresponding to the number of glasses or windows to be supplied. As this number is variable, I do not wish to be restricted in this respect, but I have here shown the said frame as having two permanent windows 10 and 11 and two movable windows 12 and 13, the latter of which are actuated as the doors are swung on their hinges.

It is to be understood that one of the side frames 9 is provided for each side of the car but in describing the invention, the frame and accessories for one side of the top alone will be described, it being understood that the parts are duplicated on the opposite side.

The frame 9 is shown in Fig. 5 as lapping over the outer surface of the body at the upper edge and it may be secured thereto in appropriate manner, as by the fastenings 14. The permanent windows 10 and 11 are provided by forming openings in the side frame and by glazing the said openings in known way, and as the details of this construction are not a part of the present invention, they will not be described more minutely.

The frame 9 at points above the doors 15 and 16 have openings 17 and 18 respectively, which are guarded under ordinary conditions by the transparent materials 19 and 20 respectively, and these transparent materials may be glass, celluloid or other known product. Each of the transparent materials is in a sash such as 21 and the inner surface of the frame 9 is provided with guides 22 and 23 in which the sash 21 are slidable so that the said sash may be slid from the positions which they occupy over the doors to positions in alinement with the permanent windows, so that the car may be ventilated through the openings created by the dislodgment of the movable sash.

The frames 24 and 25 of the movable windows 12 and 13 are connected to the frame 9 by hinges, such as 26 so that the frames 24 and 25 move with the doors 15 and 16 to permit the passengers to enter or leave the body of the car and as a means for communicating the motion of the doors to the said frames, the frames 24 and 25 each has a cleat 27 thereon which fits in the opening of the door just above the said door, and the said cleat has a plate 28 with a slot 29 therein, designed to receive a stud or pin 30 carried by one of the doors, said pin being of a length greater than the thickness of the plate, the door being the part 15, in Fig. 6, although it is to be understood that either door 15 or 16 may be supplied to coöperating parts in like manner.

When the removable inclosure is applied to the rigid frame of an automobile, the plates 28 rest on the swinging doors thereof, the pins 30 are inserted in the slots 29 and rigidly secured in the upper edge of the doors, the pins 30 being provided with heads 30' to receive a suitable tool for positioning said pin.

Each swinging frame has a notch such as 31 in its edge to receive a plate 32 which is attached to the sliding sash and this plate has an ear 33 constituting a handle by which the sliding sash is manipulated. The sliding sash is held against movement by a hook 33ª which swings over the edge of the plate 32, thus locking the sash in its closed position, it being understood that by disengaging the hook from the plate, the sliding sash may be operated.

The brace 34 for the front end of the top is shown in a position parallel with the lower edge of the top, but it is to be noted that said brace 34 may be moved to a position at an angle with relation to the lower edge of the top, whereby the top is in a position to be folded.

From an inspection of the drawing, and from the foregoing description, it will be apparent that the ordinary foldable top may be converted into an inclosed vehicle by applying the side frames to the body and top of an ordinary automobile and that by reason of the provision of the elements described, the automobile may be ventilated and the doors may be made to operate windows whereby openings are formed in the sides of the frame of sufficient size as will permit ingress and egress to and from the vehicle.

From an inspection of Fig. 6, it will be seen that the pin 30 is of such length that it will project through the plate 28 and when the door is opened and there is sufficient variance in the degree of movement of the frame and door, the pin 30 may slide vertically in the slot 29 while moving longitudinally of said slot. If, as in some automobiles, the door does not swing in a true horizontal plane, this provision will be found of value in compensating for the difference of movement of the two parts.

I claim—

1. In an automobile, a body and top having an intervening space, frames in the intervening space between the top and body, means for securing the frames to the side of a vehicle, said frames having apertures therein, apertured members hinged above the doors of the body, sashes carried by the apertured members, guides carried by the apertured members and the frames whereby the said sashes are movable to guard or unguard the apertured members, means associated with each door for communicating motion of said door to one of the apertured members, each of said frames being provided with a recess, a handle on the sliding sash adapted to enter said recess, and a latch for holding the sliding sash against movement.

2. In combination with the body and foldable top of an automobile, an inclosing device fitted under the foldable top and comprising a plurality of panel members and hinged door members, the lower ends of each door member and panel member adapted to overlap the upper edge of the body, a slotted plate carried by each door section of the inclosing device, said slotted plate being supported over the respective doors of the body, a pin carried by each door of the body, said pins being of a length greater than the thickness of the plates and adapted to engage within the slots of the respective plates, whereby vertical and reciprocatory movement of one door with relation to the other door is permitted.

In testimony whereof, I affix my signature in the presence of two witnesses.

WEBB C. SWEET.

Witnesses:
  M. I. PFEIFER,
  LOTTIE E. BARKLEY.